United States Patent [19]

Kim et al.

[11] Patent Number: 5,264,478

[45] Date of Patent: Nov. 23, 1993

[54] FILMING LIQUID COMPOSITION FOR COLOR BRAUN TUBES

[75] Inventors: Minho Kim; Ikchull Ihm, both of Kyunggi, Rep. of Korea

[73] Assignee: Samsung Electron Devices Co., Ltd., Rep. of Korea

[21] Appl. No.: 925,853

[22] Filed: Aug. 6, 1992

[30] Foreign Application Priority Data

Aug. 21, 1991 [KR] Rep. of Korea ............. 91-14417[U]
Aug. 21, 1991 [KR] Rep. of Korea ............. 91-14418[U]

[51] Int. Cl.$^5$ ............................................. C08K 3/22
[52] U.S. Cl. ................................... 524/430; 427/64; 427/68
[58] Field of Search ..................... 524/430; 427/64, 68

[56] References Cited

U.S. PATENT DOCUMENTS

| | | | |
|---|---|---|---|
| 4,122,213 | 10/1978 | Ito et al. | 427/64 |
| 4,339,475 | 7/1982 | Hinosugi et al. | 427/68 |
| 4,590,092 | 5/1986 | Giancaterini et al. | 427/68 |
| 4,990,366 | 2/1991 | Pezzulo et al. | 427/68 |

FOREIGN PATENT DOCUMENTS 57-31614 7/1982 Japan .
61-696 1/1986 Japan .

*Primary Examiner*—Paul R. Michl
*Assistant Examiner*—Edward Cain
*Attorney, Agent, or Firm*—Christie, Parker & Hale

[57] ABSTRACT

The present invention discloses a filming liquid composition for color Braun tubes comprising deionized water, an acrylic emulsion, ammonium oxalate, ethyl silicate, and titanium oxide, aluminium oxide or a mixture thereof. The color Braun tube manufactured using the filming liquid composition shows the characteristics of high reflection efficiency of the aluminium vacuum evaporation film and excellent luminescent brightness of the color Braun tube.

2 Claims, 1 Drawing Sheet

(1) The prior art
(2) The present invention

FILMING LIQUID COMPOSITION FOR COLOR BRAUN TUBES

BACKGROUND OF THE INVENTION (1) Field of the Invention

This invention relates to a filming liquid composition, in particular to a filming liquid composition usable to manufacture color Braun tubes which exhibit significantly increased luminescent brightness of fluorescent screen.

(2) Description of the Prior Art

In general, a method of manufacture for a fluorescent film of a color Braun tube comprises forming on the inner face of the Braun tube a fluorescent screen with a uniform stripe or dot pattern of green phosphor, blue phosphor and red phosphor, thereafter forming an aluminium vacuum evaporation film on the fluorescent screen.

However, the surface of the formed fluorescent screen is not even because of the gaps between the phosphor stripes or dots, which leads to a problem in that the vacuum evaporated aluminium will penetrate into the phosphors so as to lower the mirror reflection effect of the aluminium film if aluminium film is formed directly on the fluorescent screen.

In order to solve this problem, the gaps between the phosphor stripes or dots are covered with a special coating liquid, which is a so-called filming.

The filming technology is described by way of example in Japanese Patent Publication No. Sho. 57-31614 and 61-696.

In the prior art, a filming liquid composition generally comprises an acrylic emulsion as a major ingredient and polyvinyl alcohol as a cross-linking agent. However, those filming liquid compositions of the prior art have caused a problem that the organic materials such as polyvinyl alcohol were decomposed to generate a gas in the calcining process subsequent to the aluminium vacuum evaporation, and the gas caused a swelling of the aluminium film to lower the evenness of the aluminium film, thereby decreasing the mirror reflection effect. Thus, the brightness of the color Braun tube was relatively low.

In addition to this, the filming liquid of the prior art with a high pH value must be used to increase the adhesive power of the filming film, but these filming liquid compositions with a high pH value have suffered the gellation of polyvinyl alcohol in the composition.

SUMMARY OF THE INVENTION

The present invention has been developed for the purpose of solving the above-described problems of the prior art.

Therefore, an object of the present invention is to increase the reflection efficiency of aluminium film by inhibiting the swelling of aluminium film in the calcining process and improving the evenness of filming film.

Another object of the present invention is to increase the luminescent brightness of color Braun tubes by increasing the reflection efficiency of the aluminium film.

In order to achieve the above objects, the present invention provides a filming liquid composition for color Braun tubes, comprising:

a) 20-36 weight percent of an acrylic emulsion;
b) 0.2-0.4 weight percent of ammonium oxalate;
c) 0.5-8 weight percent of ethyl silicate;
d) 0.01-8 weight percent of a white material selected from the group consisting of titanium oxide; aluminium oxide and a mixture thereof, and
e) a remaining amount to 100 weight percent of deionized water.

DESCRIPTION OF THE PREFERRED EMBODIMENTS

Figure 1:
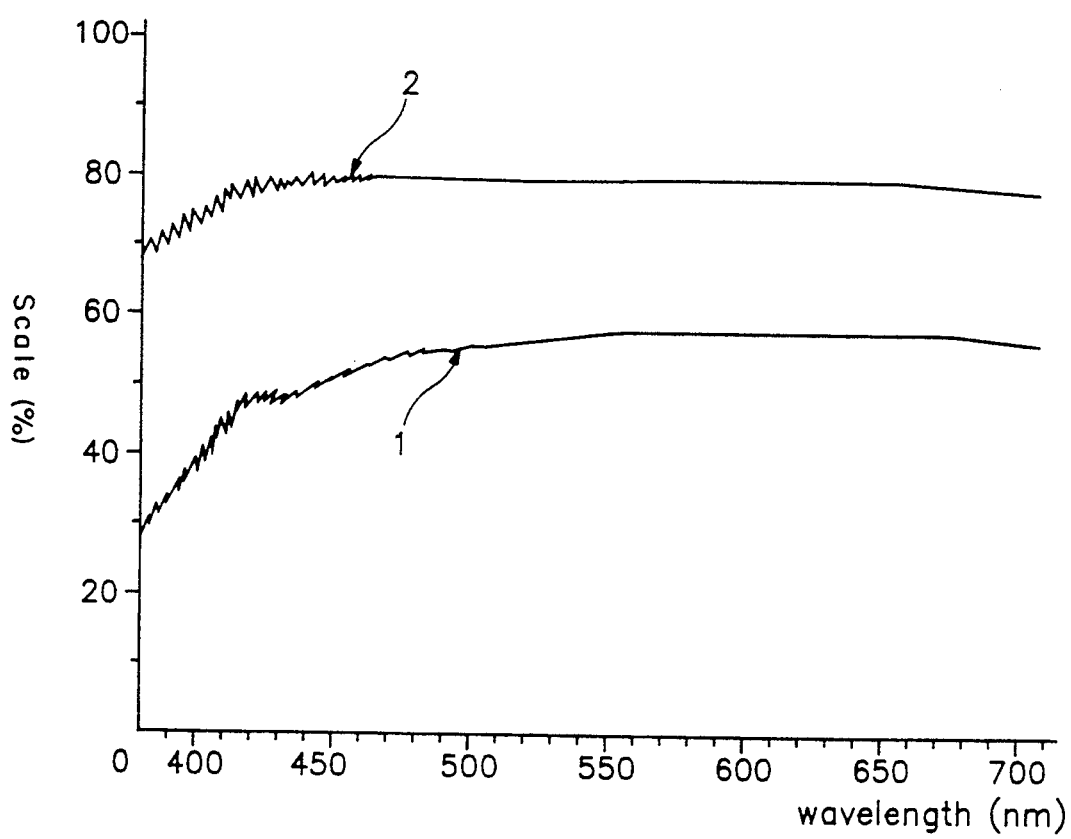
FIG. 1 is a graph which shows the reflection efficiencies measured for a color Braun tube manufactured with a filming liquid composition of the present invention and a color Braun tube manufactured with a conventional filming liquid composition.

In a composition of the present invention, an acrylic emulsion is a major ingredient which determines the thickness of the filming film, and ethyl silicate is added in the state of a solubilized aqueous solution to regulate pH value of the composition, and an aqueous ammonium oxalate solution serves as an organic foaming agent.

The purpose of adding titanium oxide, aluminium oxide or a mixture thereof is to increase the luminescent brightness of color Braun tubes. The mechanism is as follows. A finely divided powder of titanium oxide and/or aluminium oxide is mixed into the filming liquid and a filming film is formed with the filming liquid, on the film, an aluminum vacuum evaporation film is formed to serve as a reflecting film which reflects the total surface of the panel toward the phosphor luminescent light scattered all around after its radiation from collision with electrons emitted from an electron gun.

Therefore, the reflection efficiency of the Al vacuum evaporation film is increased and accordingly, the luminescent brightness of the color Braun tube is increased.

According to the present invention, the added amount of ethyl silicate is preferably in the range of from 0.5 to 8 weight percent based on the total filming liquid. Addition of ethyl silicate in this amount maintains the pH of the filming liquid composition at 6-9, which causes the adhesive power of the filming film to be improved. If ethyl silicate is added in the amount of more than 8 weight percent, the pH of the filming liquid will exceed pH 9 so that the evenness of the filming film will be poor. On the contrary, if ethyl silicate is added in the amount of less than 0.5 weight percent, the pH of the filming liquid will be less than 6 so that the adhesive power of the filming film will be low.

According to the present invention, the added amount of titanium oxide, aluminium oxide or a mixture thereof is preferably in the range of from 0.01 to 8 weight percent based on the total filming liquid. If titanium oxide, aluminium oxide or a mixture thereof as a white reflecting material is added in the amount of more than 8 weight percent, this white reflecting material will serve as an injurious factor in the exciting mechanism between the electrons and the fluorescent screen so that the luminescent brightness of the obtained color Braun tube will be low. Furthermore, the average particle diameter of titanium oxide and aluminium oxide is preferably less than 0.5 $\mu$m. If it is more than 0.5$\mu$m, the objects to achieve by the present invention will not attained sufficiently.

EXAMPLES AND COMPARATIVE EXAMPLES

Now, examples and comparative examples will be presented to illustrate this invention. However, it is understood that this invention is not limited to these examples.

EXAMPLE 1

After the following ingredients were mixed and stirred sufficiently to prepare a filming liquid composition for color Braun tubes, the filming procedure was carried out with the obtained composition using a fluorescent screen-manufacturing apparatus attached with an ultraviolet heater far away. Then, the conventional procedure was carried out to manufacture a color Braun tube.

| Ingredients | Amounts |
| --- | --- |
| Deionized water | 1.6 kg |
| Acrylic emulsion | 1.0 kg |
| 10 wt% aqueous ammonium oxalate soln. | |
| 5 wt % aqueous ethyl silicate soln. | 0.5 kg |
| Titanium oxide | 5 g |

EXAMPLE 2

Except that the amount of 5 wt% aqueous ethyl silicate solution in Example 1 was changed to 0.35 kg, the substantially same procedure as Example 1 was repeated to manufacture a color Braun tube.

EXAMPLE 3

Except that the amount of 5 wt% ethyl silicate solution in Example 1 was changed to 2 kg, substantially the same procedure as Example 1 was repeated to manufacture a color Braun tube.

EXAMPLE 4

Except that 5 g of aluminium oxide was used as a white reflecting material instead of titanium oxide in Example 1, substantially the same procedure as Example 1 was repeated to manufacture a color Braun tube.

EXAMPLE 5

Except that a mixture of aluminum oxide 2 g and titanium oxide 3 g was used as a white reflecting material instead of titanium oxide in Example 1, substantially the same procedure as Example 1 was repeated to manufacture a color Braun tube.

COMPARATIVE EXAMPLE 1

Except that conventional filming liquid composition from the following ingredients was used as the filming liquid composition, substantially the same procedure as Example 1 was repeated to manufacture a color Braun tube.

| Ingredients | Amounts |
| --- | --- |
| Deionized water | 1.6 kg |
| Acrylic emulsion | 1.0 kg |
| Polyvinyl alcohol | 1.2 kg |
| 10 wt % ammonium oxalate soln. | 0.5 kg |
| 5 wt % ammonium hydroxide | 200 ml |

With the color Braun tubes manufactured in the above-described Examples 1 to 5 and Comparative Example 1, reflection efficiency of aluminium vacuum evaporation film and luminescent brightness of color Braun tubes are measured according to the following methods. The obtained results will be listed in Table 1 below.

Also, the results obtained from measuring the reflection efficiencies of the aluminium vacuum evaporation film of the color Braun tubes manufactured in Example 5 and Comparative Example 1 are shown and compared in FIG. 1. As can be seen from the graph in FIG. 1, the reflection efficiency of the color Braun tube manufactured using the filming liquid composition of the present invention is higher by 20 percent than that of the color Braun tube manufactured using the conventional filming liquid composition. The result is that the luminescent brightness of the fluorescent screen of the color Braun tube will be increased by 10-30 percent.

TABLE 1

Test results of color Braun tubes

| Example No. | Reflection efficiency of aluminium vacuum evaporation film[1] | Luminescent brightness of color Braun tube[2] |
| --- | --- | --- |
| Example 1 | 80% | 120% |
| Example 2 | 61% | 110% |
| Example 3 | 63% | 106% |
| Example 4 | 79% | 118% |
| Example 5 | 82% | 119% |
| Comparative example 1 | 60% | 100% |

Note
[1] The value obtained from measurement of reflection efficiency for the aluminium vacuum evaporation film using a Spectrogard Color System, Pacific Scientific Co., Ltd.
[2] The relative value obtained from comparing the luminescent brightness measured at 23.5 kv, 500 µA using a MECC system to that measured with the fluorescent screen of Comparative Example 1.

As is apparent from the foregoing, the filming liquid composition of the present invention is an excellent filming liquid composition which can be used to manufacture color Braun tubes with highly increased reflection efficiency and luminescent brightness.

What is claimed is:

1. A filming liquid composition for color Braun tubes, comprising
   a) 20-36 weight percent of an acrylic emulsion,
   b) 0.2-0.4 weight percent of ammonium oxalate;
   c) 0.5-8 weight percent of ethyl silicate;
   d) 0.01-8 weight percent of a white material selected from the group consisting of titanium oxide; aluminium oxide and a mixture thereof; and
   e) a remaining amount to 100 weight percent of deionized water.

2. A filming liquid composition as defined in claim 1, wherein said white material has an average particle diameter of less than 0.5 µm.

* * * * *

UNITED STATES PATENT AND TRADEMARK OFFICE
CERTIFICATE OF CORRECTION

PATENT NO. : 5,264,478
DATED : November 23, 1993
INVENTOR(S) : Minho Kim; Ikchull Ihm It is certified that error appears in the above-indentified patent and that said Letters Patent is hereby corrected as shown below:

Column 3, line 23, after "10 wt% aqueous oxalate soln." under the title "Amounts" insert -- 0.1 kg --.

Column 4, line 5, under the title "Ingredients" change "10 wt % ammonium oxalate soln." to -- 10 wt % aqueous ammonium oxalate soln. --.

Column 4, line 20, after "be seen" change "f rom" to -- from --.

Signed and Sealed this

Sixteenth Day of August, 1994

*Attest:*

BRUCE LEHMAN

*Attesting Officer*  *Commissioner of Patents and Trademarks*